G. K. GARVIN & E. J. McCLELLAN.
CHUCK.
APPLICATION FILED MAY 14, 1909.
976,452.
Patented Nov. 22, 1910.
2 SHEETS—SHEET 1.
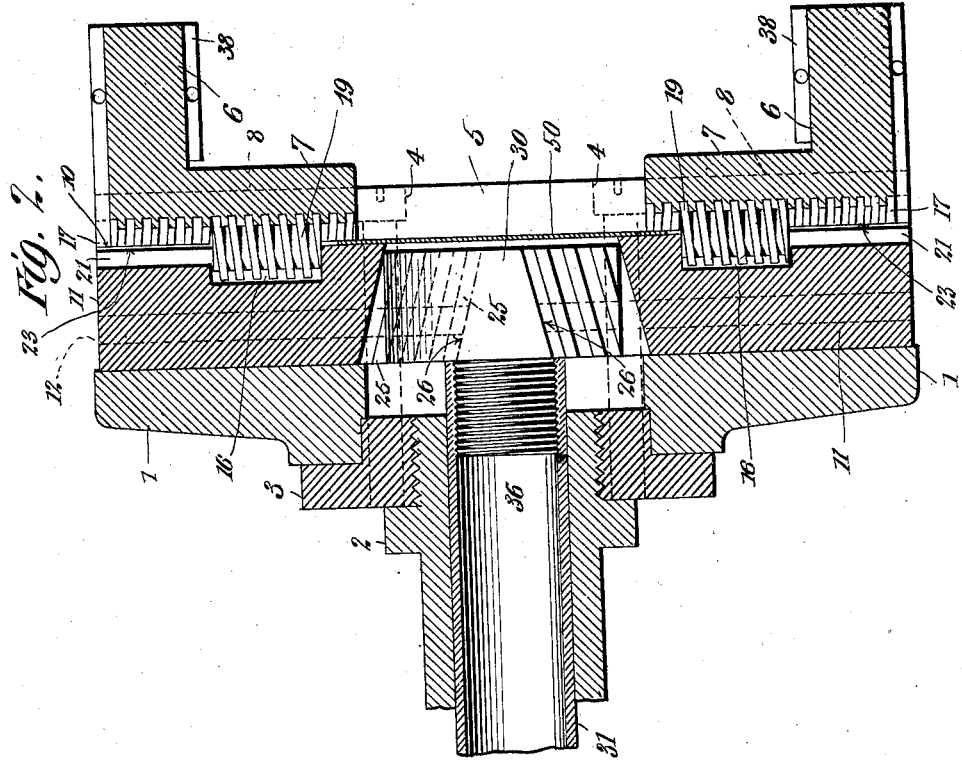
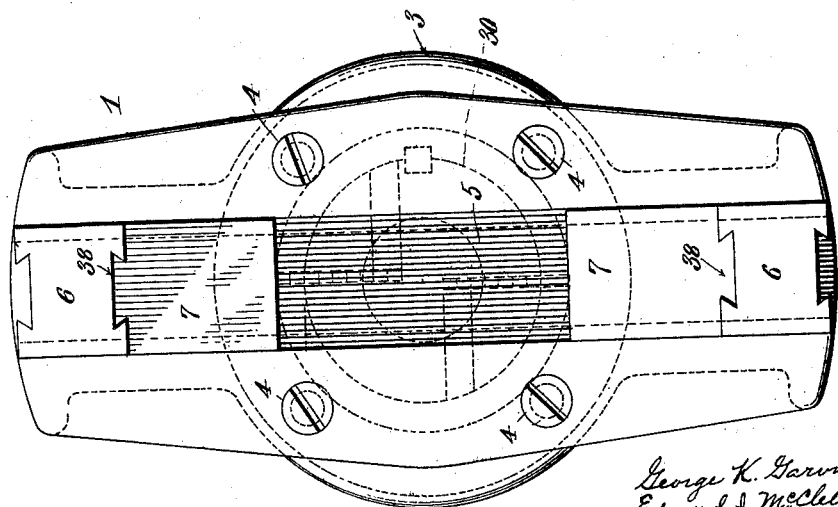

G. K. GARVIN & E. J. McCLELLAN.
CHUCK.
APPLICATION FILED MAY 14, 1909.
976,452.
Patented Nov. 22, 1910.
2 SHEETS—SHEET 2.
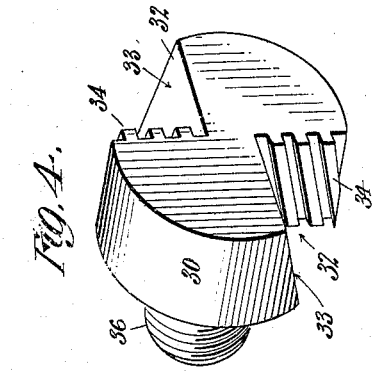
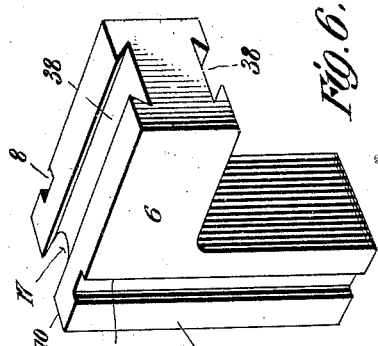
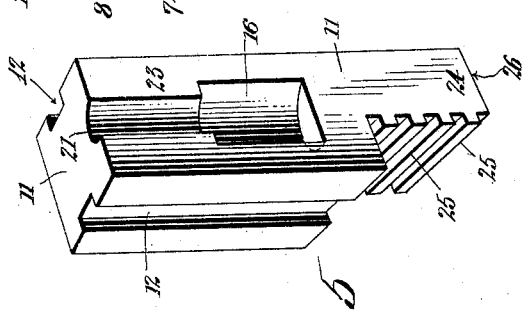
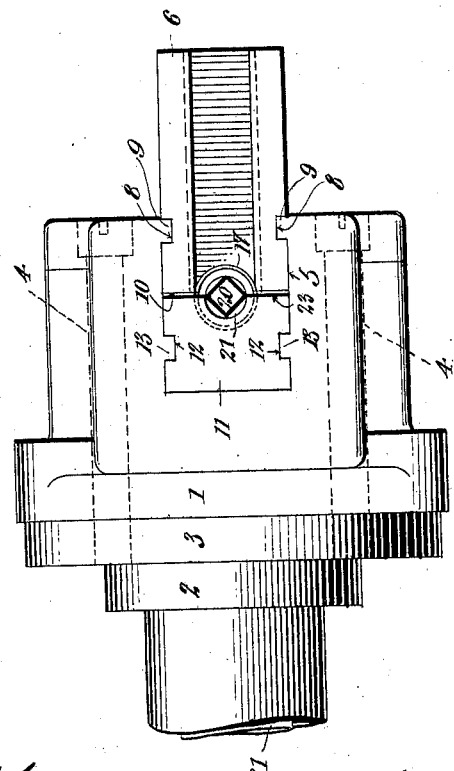

UNITED STATES PATENT OFFICE.

GEORGE K. GARVIN AND EDWARD J. McCLELLAN, OF NEW YORK, N. Y., ASSIGNORS TO THE GARVIN MACHINE COMPANY, A CORPORATION OF NEW YORK.

CHUCK.

976,452.

Specification of Letters Patent. Patented Nov. 22, 1910.

Application filed May 14, 1909. Serial No. 495,837.

*To all whom it may concern:*

Be it known that we, GEORGE K. GARVIN and EDWARD J. McCLELLAN, citizens of the United States, residing at the city of New York, in the borough of Manhattan and State of New York, have invented certain new and useful Improvements in Chucks, of which the following is a full, clear, and exact description.

Our invention relates to a chuck for monitor lathes and other purposes, particularly where there is a draw tube for simultaneously tightening the jaws of the chuck upon the work. The present chuck is adapted to secure this simultaneous clamping of the jaws on either eccentric or concentric work, or on any irregular shape. The chuck is designed primarily for manufacturing processes where a considerable number of pieces or parts of the same general shape are required to be successively machined in a lathe. Under these circumstances it is evident that a limited clamping movement of the chuck jaws is sufficient, after a proper initial adjustment or setting has been made. This setting or adjustment should be adapted to suit the special piece to be operated on. The subsequent clamping of the work should be done by a simple, easy manipulation, and, of course, should be as secure and positive as possible. A positive unclamping or withdrawal of the chuck jaws from the work is also a desirable feature.

It is the purpose of our invention to obtain all these various characteristics in a type of chuck having great simplicity and wearing qualities.

We have illustrated our invention applied to a two-jaw chuck, although the features and principles are applicable to a chuck having any number of jaws which may be desired. For the sake of lightness we make use of a draw tube for securing the final clamping of the jaws on the work, and it will be seen that we secure a very direct and positive action in the application of the movement of the draw tube to the purpose of displacing the chuck jaws in their clamping action. While we have termed this part a "draw tube" we do not of course desire to be limited or restricted to a tube since it is evident that a solid rod may be used if desired.

With the foregoing and other objects in view our invention consists in the features of construction and combination as hereinafter set forth and claimed.

In the drawings: Figure 1 is a front or face view of a chuck embodying the principles of our invention; Fig. 2 is a longitudinal sectional view of the same; Fig. 3 is a top view; Fig. 4 is a perspective view of the head at the end of the draw-tube; Fig. 5 is a perspective view of a jaw supporting block or member; Fig. 6 is a perspective view of one of the jaws, and Fig. 7 is a sectional view of the threaded plug.

Referring to the drawings in which like parts are designated by the same reference sign, 1 denotes the frame or body of the chuck which is designed to be threaded or otherwise attached to the nose of a lathe spindle 2. The chuck frame may be integrally formed in one piece, but we prefer to have a rear plate 3 internally threaded to be received on the lathe spindle and screwed to the main frame of the chuck by screws 4.

The chuck frame 1 is recessed radially across its front face to provide ways for the jaws. We have illustrated a chuck formed with a single diametral slot 5 in the drawings, providing for two jaws 6. Each of these jaws has a base portion 7 with a pair of longitudinal grooves or guides 8 on the opposite side faces thereof. The chuck frame 1 is correspondingly provided with ribs or ways 9 so that the chuck jaws are guided toward and from one another in radially opposite directions.

Each chuck has the rear face 10 of its base flat and parallel with the ways on which it slides. The diametral slot 5 is quite deep and is adapted to receive what we term jaw supporting blocks 11 therein directly behind the flat faces 10 of the jaws. Each jaw supporting block 11 has grooves 12 which fit correspondingly shaped ribs or ways 13 of the chuck frame, and which guide the jaw supporting blocks in directions toward and from one another and parallel to the paths of movement of the chuck jaws. Each jaw supporting block 11 has a flat front face 23 which is parallel and lies closely adjacent to the flat face 10 of the adjacent jaw. The jaw supporting block and the jaw have their faces 23 and 10 formed with oppositely disposed semi-cylindrical recesses 16 and 17. The recess 16 of the jaw supporting block is of comparatively limited longitudinal extent, but the recess 17 of the jaw extends from the top to the bottom of the latter and is formed with a thread throughout its length, thereby constituting in effect a female screw. 19 denotes a threaded plug or cylinder just long enough to closely fit the cavity 16 and having an outside diameter adapted to snugly rotate within the cavity 16. This threaded plug 19 meshes with the female threaded groove 17 of the corresponding chuck jaw, and displaces the latter in and out relative to the jaw supporting block when angularly turned. The end of the plug 19 is conveniently formed with a square hole 20 constituting a socket for any suitable wrench. 21 denotes a groove in the block 11, in alinement with the socket hole 20 through which said wrench may be inserted. In order to take up any lost motion due to wear or other causes in the endwise fit of the threaded plug 19 in its cavity 16, we construct the threaded plug with an interior coaxially threaded hole 22, in which is received an adjustment screw 22'. This screw is accessible for adjustment by means of a screwdriver inserted through the socket hole 20, whereby it can be tightened whenever adjustment is needed. In normal use this screw forms a fixed part of the threaded plug, virtually making the length of the latter adjustable to exactly suit its containing recess 16.

Each jaw supporting block 11 is reduced in thickness at its inner end by cutting away material on one side, thereby leaving a narrow extension 24 having about half the width of the major portion. On its inside face this extension 24 is milled with a series of inclined longitudinally rectilinear teeth 25, the milling being continued to the extent of correspondingly fixing the inclination and the plane of the lower end face 26 of the jaw supporting block. The jaw supporting blocks are made identical in all respects, so that when they are inserted in the slot 5 in their properly opposed relation, their ribs 25 will be faced in opposite directions, and directed at opposite inclinations. The end faces 26 will correspondingly take the positions shown in Fig. 2, corresponding to the direction of their corresponding ribs 25.

30 denotes a head which is fitted within the chuck frame 1 and is attached to the rectilinearly reciprocable draw-tube 31. The head 30 is formed of a short, stout cylinder of metal recessed deeply at 32 with deep rectilinearly cut notches of a shape exactly corresponding to the extensions 24 of the jaw supporting blocks. That is to say each recess 32 has integrally formed a flat inclined face 33 adapted to contact with the end face 26 of the jaw supporting block, and has lips 34 adapted to mesh or interlock with the ribs 25 of the jaw supporting block. Under these circumstances the jaw supporting blocks are adapted to be displaced inward or outward by the longitudinal movement of the head 30 within the chuck frame. The head 30, which preferably is formed as a unitary structure, has a threaded stud or boss 36 on one side which is screwed into the end of the draw-tube 31 whereby the head may be positively impelled in either direction; these movements of the head producing corresponding inward and outward movements of the jaw supporting block 11, on account of the various inclined teeth 34 and 25 which act individually like wedges or inclined planes. As a considerable number of these wedges are available in either direction of movement of the parts, it is evident that not only is the movement of the chuck jaws positive both inward and outward, but has great wearing qualities as well. When however the head does wear out, it is readily replaceable by reason of its threaded connection.

In order to prevent chips and dirt from entering the interior of the chuck and interfering with its proper working, we provide a guard plate 50 composed of a thin strip of sheet metal loosely inserted between the blocks 11 and the jaws 6. In this relation the guard plate is held against lateral movement by the walls of the slot 5 and against longitudinal displacement by the threaded plugs 19 which lie adjacent to its ends. The guard plate is therefore adapted to form a constant barrier against the intrusion of any chips or dirt to the inclined teeth of the chuck, upon which are dependent its essential working functions.

The use and operation will be obvious from the foregoing description. The chuck jaws 6 are assembled upon the jaw supporting blocks, and adjusted in any desired way by manipulating the screw plugs 19. It is evident that chuck jaws can be inserted with their working portions 6 either inward or outward with respect to the chuck frame 1, adapting them to wider ranges of sizes than would be had if they were not reversible in this way. Screw plugs 19 obviously coöperate with the threaded groove 17 equally well in either case. Any form of chuck jaw may be employed as desired. We have illustrated chuck jaws having undercut recesses 38 to receive special work-holding tools or fixtures.

The jaws being properly arranged and adjusted to suit any particular class of work, it is merely necessary to impel the draw-tube 31 in and out to effect the clamping and unclamping of the jaws in an obvious manner. The range of movement due to this latter action is not very great, but the power is considerable and may be made as great as desired by suitably fixing the angle of the ribs 25, 34. Above all the movement of the chuck jaws is positive in both directions, and abundant wearing surfaces are provided in both directions of movement to insure against looseness throughout the life of any ordinary chuck.

What we claim, is:—

1. In a chuck, a frame having a deep diametrical slot with two pairs of ways, a pair of jaw-supporting blocks guided on the inner ways, a pair of jaws guided on the outer ways, means wholly supported between said jaws and blocks for fixing and varying their relative positions, and a draw-tube having a head with two series of parallel inclined teeth for respectively displacing said blocks radially in the groove.

2. A chuck comprising jaws, jaw-supporting blocks, means wholly supported by said blocks and jaws for fixing and varying their relative positions, a guard plate supported between the blocks and jaws, and means having inclined teeth for radially displacing said blocks.

3. A chuck comprising a frame or body having radial grooves, blocks movable in said grooves and having semi-cylindrical recesses in their front faces, jaws having threaded recesses extending longitudinally across their entire rear faces, threaded plugs fitting in said recesses between said jaws and blocks, a guard plate between the jaws and blocks and held against longitudinal displacement by said threaded plugs, and means for radially displacing said blocks.

4. A chuck comprising jaws, jaw-supporting blocks having inner ends, means wholly supported between said blocks and jaws for fixing and varying their relative positions, and a draw tube having a head provided with recesses for the reception of said jaw-supporting block ends, the respective engaging surfaces of said head and ends being formed to provide groups of inclined teeth for radially displacing said blocks.

5. A chuck comprising a frame or body, jaws mounted thereon, jaw reciprocating means comprising radially disposed parts provided with inclined grooves adjacent the inner ends thereof, a member axially disposed with respect to said chuck and reciprocably mounted and a block secured to the end of said member and disposed in alinement with the axis of said chuck, said part being substantially solid and having recesses in the sides thereof, and having teeth upon faces of said recesses disposed for engagement with the inclined grooves of the parts aforesaid.

In witness whereof, we subscribe our signatures, in the presence of two witnesses.

GEORGE K. GARVIN.
EDWARD J. McCLELLAN.

Witnesses:
JULIUS GOLDSMITH,
J. T. WILLIAMS.